United States Patent [19]

Nystuen et al.

[11] Patent Number: 4,623,811
[45] Date of Patent: Nov. 18, 1986

[54] MOTOR-FAN ASSEMBLY FOR VACUUM CLEANER

[75] Inventors: Arne M. Nystuen, Lincoln Township, Berrien County; John M. Kuss, St. Joseph Township, Berrien County, both of Mich.

[73] Assignee: Whirlpool Corporation, Benton Harbor, Mich.

[21] Appl. No.: 737,141

[22] Filed: May 22, 1985

[51] Int. Cl.[4] .................... H02K 19/20; H02K 23/42
[52] U.S. Cl. .................................. 310/192; 15/412; 310/43; 310/49 R; 310/91; 310/216
[58] Field of Search ............. 15/412; 29/596; 310/42, 310/43, 49 R, 65, 91, 162, 172, 190–193, 216, 217, 254, 259

[56] References Cited

U.S. PATENT DOCUMENTS

| | | |
|---|---|---|
| 1,493,851 | 5/1924 | Ferris ................................ 310/193 |
| 1,622,204 | 3/1927 | Papst . |
| 2,000,699 | 5/1935 | Harding ............................ 171/223 |
| 2,073,526 | 3/1937 | Pestarini .......................... 171/123 |
| 2,207,304 | 7/1940 | Rosenberg ....................... 171/227 |
| 2,465,835 | 3/1949 | Thomas .............................. 322/6 |
| 2,500,191 | 3/1950 | Lee ................................... 318/325 |
| 2,613,242 | 10/1952 | Shumaker et al. ............... 172/278 |
| 2,662,194 | 12/1953 | Jepson .............................. 310/50 |
| 3,032,671 | 5/1962 | Daugherty et al. ............... 310/214 |
| 3,235,761 | 2/1966 | Hohen ............................... 310/172 |
| 3,412,270 | 11/1968 | Wacek .............................. 310/66 |
| 3,421,034 | 1/1969 | Hershberger ..................... 310/172 |
| 3,560,823 | 2/1971 | Nystuen ............................ 318/221 |
| 4,455,499 | 6/1984 | Sudler ............................... 310/156 |

*Primary Examiner*—Patrick R. Salce
*Assistant Examiner*—D. L. Rebsch
*Attorney, Agent, or Firm*—Wood, Dalton, Phillips, Mason & Rowe

[57] ABSTRACT

Structure for maintaining accurate spacing between opposed pole elements of a split-field coil structure. The motor structure includes a support for supporting the armature for rotation about an axis and a field coil structure having opposed C-shaped laminated cores. Each core has a pair of legs forming motor poles, each pole being defined by an arcuate surface spaced radially from the armature and a distal end surface. The core further defines a bight portion extending between the legs. The field coil is wound about a two-piece bobbin which serves further to retain the laminations of the field coil in stacked, assembled relationship. The end surfaces of the legs of the cores are in spaced, opposed alignment, with the support portion fitting therebetween for providing the accurately maintained minimum spacing between the pole end surfaces.

13 Claims, 4 Drawing Figures

U.S. Patent   Nov. 18, 1986   4,623,811
FIG. 1
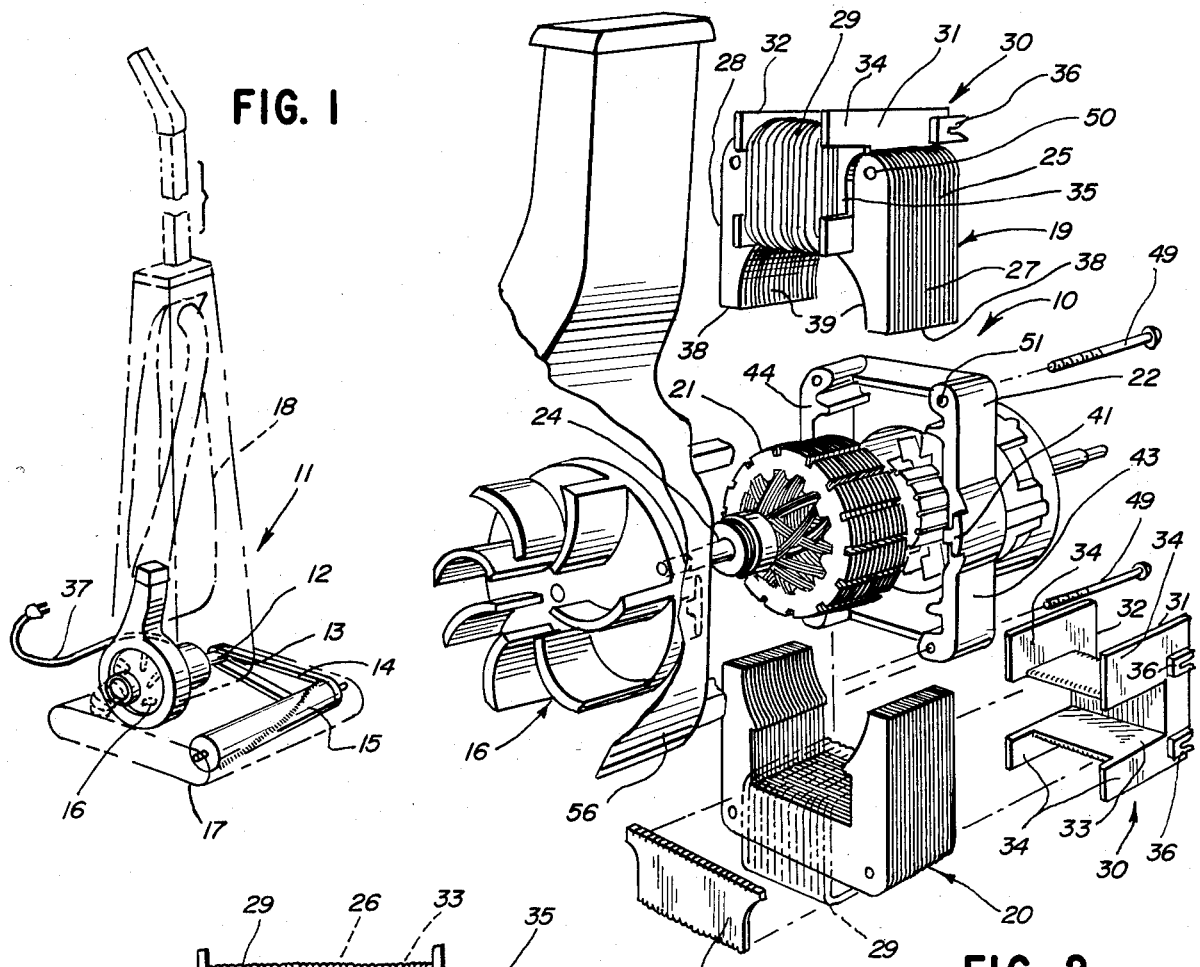
FIG. 2
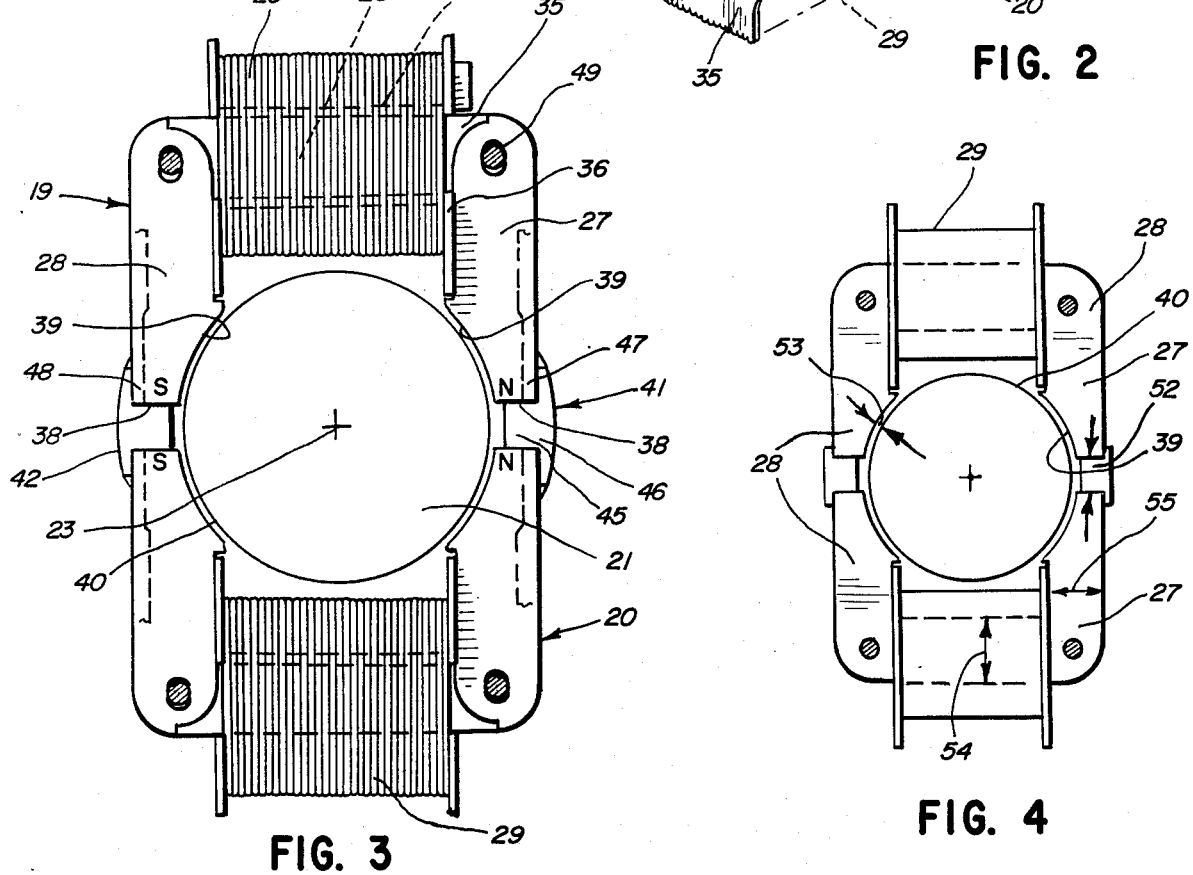
FIG. 3
FIG. 4

MOTOR-FAN ASSEMBLY FOR VACUUM CLEANER

BACKGROUND OF THE INVENTION

1. Field of the Invention

This invention relates to electric motors and in particular to electric motor structures for use in vacuum cleaners and the like.

2. Description of the Background Art

In one known form of electric motor, the field windings are wound on spaced C-shaped poles. The legs of the opposed C-shaped poles may be spaced apart to define an air gap. Current flow through the coil wound on the bight portion of the C-shaped pole produces flux in the salient pole legs. Because of the reluctance, armature reaction is reduced, thus providing improved performance of the motor.

A motor utilizing split poles is illustrated in U.S. Pat. No. 1,622,204 of Herman Papst.

In U.S. Pat. No. 2,000,699 of William R. Harding, an arc welding generator is disclosed utilizing spacers of non-magnetic material between an upper portion and a lower portion of the main frame of the motor.

In U.S. Pat. No. 2,073,526, Giuseppe Massimo Pestarini discloses a dynamo-electric machine wherein the stator frame is provided with a layer of suitable magnetically insulating or less permeable material at suitable points in place of air gaps. Pestarini further teaches that in lieu of the inserted material, the section of the stator frame at these points may be reduced, to cause saturation at a relatively small value of flux.

Doran D. Hershberger discloses, in U.S. Pat. No. 3,421,034, the use of an elongated slot extending across the yoke section. After the core is cut to define the slots, bonding material in an unhardened state is applied.

Charles A. Thomas discloses, in U.S. Pat. No. 2,465,824, a dynamo-electric machine wherein the stator segments are separated by nonmagnetic spacers and secured together mechanically by conventional nonmagnetic curing means.

SUMMARY OF THE INVENTION

The present invention comprehends an improved motor structure wherein a portion of the armature support means defines spacer means fitting between the opposed end surfaces of the split core pole leg in the flux gaps formed therebetween for accurately maintaining the minimum spacing between the pole end surfaces and thereby providing an accurately sized air gap between the poles.

The invention further comprehends the provision of an improved bobbin for carrying the field coil on the bight portion of the core, which bobbin further acts as means for maintaining the laminations of the core in stacked assembly.

In the illustrated embodiment, the support means is formed as a molded synthetic resin structure. The spacer means are molded integrally with the support means and additional retaining means may be formed integrally with the support means for cooperation with the spacer means in retaining the cores in the desired accurately preselected spaced relationship.

The length of the air gap between the pole end surfaces is preferably greater than the radial spacing between the armature and the confronting surface of the poles.

In the illustrated embodiment, the length of the air gap between the pole end surfaces is in the range of approximately 12 to 14 times the radial spacing between the armature and confronting pole surfaces.

The ratio of the transverse thickness of the bight to the thickness of the leg portions of the cores perpendicular to the flux path is preferably greater than 1. More specifically, the ratio is preferably in the range of approximately 1.1 to 1.2.

In the illustrated embodiment, the spacer means occupies a minor portion of the flux gap volume between the leg end surfaces.

In the illustrated embodiment, the field coil structure includes a plurality of associated insulation elements defining a bobbin in a wire coil wound thereabout. The bobbin comprises means for retaining the laminations of the core in stacked assembled relationship under a preselected pressure.

The core elements are mounted on the mounting structure and are caused to have a desired spacing between the poles thereof by utilizing mounting means having any one of a plurality of different size spacer portions.

Thus, the invention comprehends an improved motor structure utilizing a split-field coil having improved means for maintaining accurate spacing between the pole end surfaces for providing an accurately sized air gap therebetween. The improved motor structure is extremely simple and economical of construction while yet providing highly improved functioning such as in the vacuum cleaner art.

BRIEF DESCRIPTION OF THE DRAWING

Other features and advantages of the invention will be apparent from the following description taken in connection with the accompanying drawing wherein:

FIG. 1 is a perspective view of a vacuum cleaner suction fan utilizing a motor structure embodying the invention, with portions of the associated vacuum cleaner structure shown in broken lines relative thereto;

FIG. 2 is a fragmentary exploded perspective view illustrating in greater detail the motor structure embodying the invention;

FIG. 3 is an end elevation of the field coil 10 structure mounted to one portion of the support; and FIG. 4 is a schematic representation of the split core illustrating a number of dimensional relationships thereof embodying the invention.

BEST MODE FOR CARRYING OUT THE INVENTION

In the exemplary embodiment of the invention as disclosed in the drawing, an electric motor structure generally designated 10 is shown as adapted for use in a vacuum cleaner generally designated 11. As illustrated in FIG. 1, the motor structure may include a first shaft end 12 provided with a suitable pulley 13 for driving through a belt 14 a brush assembly 15 of the vacuum cleaner. The opposite end of the shaft may be provided with a suction fan 16 for drawing air in through the nozzle 17 and delivering the dirt laden air to a filter bag 18 of the vacuum cleaner.

The present invention is concerned with the construction of motor structure 10, and more specifically, with improved means for maintaining accurate spacing between a pair of field coil core structures 19 and 20 in providing improved operation of the motor.

More specifically, as seen in FIG. 2, motor 10 includes an armature 21 rotatably carried by a first support member 22 for rotation of the armature about an axis 23. The opposite shaft portion 24 of the armature is rotatably journaled in a second support 56 defining the housing for the suction fan 16, as further illustrated in FIG. 2.

The coil core structures 19 and 20 are reversely identical and more detailed description thereof will be limited to coil core structure 19, it being understood that the description applies equally to coil core structure 20. More specifically coil core structure 19 is defined by a plurality of C-shaped laminations 25 of magnetic material defining a bight portion 26 and opposite legs 27 and 28.

An insulated copper wire coil 29 is wound around a bobbin generally designated 30 provided on bight 26. The bobbin is defined by a pair of U-shaped side pieces 31 and 32 opening forwardly, as seen in FIG. 2, so as to embrace the bight portion 26 of the laminated core. A tubular cross portion 33 extends between the end pieces 31 and 32 for embracing the bight 26 between the end pieces. The length of the legs 34 of the side pieces is greater than the forward extension of the tubular cross portion 33 so that the legs project forwardly from the coil core structure 25, as seen in FIG. 2. The tubular cross portion 33 is open at its front, permitting it, together with the U-shaped end pieces, to be inserted from the rear of the bight to the embracing disposition of FIG. 2 wherein the front edge of the tubular cross portion 33 is substantially flush with the front lamination of the coil core 25. A closure plate 35 extends across the open front end of the tubular cross portion 33 and defines end portions 36 extending beyond the plane of the side pieces 31 and 32. Thus, the bight is enclosed by the cooperating U-section tubular cross portion 33 and closure plate 35 so as to provide an insulative mounting for the coil 29, which is bound thereabout, as shown in FIG. 2. The end wires of the coil may be brought to suitable connectors 36 on the side pieces, as illustrated in FIG. 2, for electrical connection to power source means, as by means of the electric cord 37 illustrated in FIG. 1.

As illustrated in FIG. 2, the legs 27 and 28 of the coil core structure 19 define distal end surfaces 38 and arcuate radially inwardly facing surfaces 39 spaced radially outwardly of the periphery 40 of the armature 21, as illustrated in FIG. 3.

As shown in FIG. 2, support 22 is provided with a pair of spacer portions 41 and 42 formed integrally with the opposite sidewalls 43 and 44 thereof. The spacer portions define T-section configurations having a stem portion 45 and an outer cross portion 46. The outer corners 47 and 48 of the legs 27 and 28 fit against the corner surface defined by the junction of the stem portion 45 and cross portion 46 of the spacers so as to accurately position the spacer end surface 38. Suitable bolts 49 are provided for securing the pole cores to the support by extension of the bolts through openings 50 in the pole cores and aligned openings 51 in the support. The openings 50 may advantageously be somewhat elliptical as shown, and slightly oversized to accommodate different width spacers 41 and 42 as described below.

As shown in FIG. 3, the spacers 41 and 42 accurately space the opposed legs of the pole cores 19 and 20 in the assembled arrangement of the motor structure. As seen in FIG. 2, the spacers project from the support 22 less than the thickness of the coil core structures 19 and 20 and, thus, occupy only a minor portion of the volume or space between the core distal end surfaces 38. Thus, the gap between the coil cores is essentially an air gap, which is accurately controlled by the spacing functioning of the spacers interposed between the coil core leg end surfaces.

The accurate disposition of the coil cores assures an accurate disposition of the arcuate surfaces 39 thereof relative to the periphery of the armature, as seen in FIG. 3. The invention comprehends that the coil core spacers 41 and 42 may have any suitable width so as to provide selective spacing between the coil cores as desired. Thus, the invention comprehends providing any one of a plurality of different size spacer portions integrally with the mounting structure to extend between the core elements so as to define any one of a plurality of different flux gap spacings therebetween as desired.

As shown in FIG. 4, it has been determined that optimum performance of the motor may be obtained by suitably controlling different mechanical dimensional ratios of the magnetic circuit defined by the split field coil cores. More specifically, as illustrated in FIG. 4, the ratio of the length of the air gap 52 to the radial spacing 53 between the armature and the arcuate coil core surfaces 39 should be greater than 1, and is preferably in the range of 12 to 14. The ratio of the thickness 54 of the coil core bight 26 to the thickness 55 of the coil core legs should be greater than 1 and is preferably in the range of 1.1 to 1.2.

In the illustrated embodiment, the stator support 22 is formed of a suitable synthetic resin, permitting the forming of the spacer 41 and 42 integrally therewith as by molding.

The ability to vary the spacing between the coil cores by utilizing suitably dimensioned spacers permits facilitated control of the operating characteristics of the motor and, thus, the appliance with which the motor is used, such as the vacuum cleaner 11 illustrated in FIG. 1. Thus, suitable selection of the spacer width can enable use of common laminations while avoiding need for modification of the motor and fan characteristics, permitting facilitated low cost manufacture of a range of appliances utilizing such variably spaced coil core structures. Illustratively, the width of the spacers may be selected for each vacuum cleaner model by changing the molded width of the spacer to match the desired appliance performance.

The securing means 49 engage the coil cores remotely of the spacer gaps and provide improved secured assembly of the coil cores to the support. The use of the novel bobbin, as described above, reduces manufacturing costs in providing means for retaining the laminations in stacked assembled relationship without the need for welding, etc. The bobbin structure effectively retains the laminations in stacked assembled relationship under a preselected pressure as desired. As discussed above, the bobbin structure may incorporate integrally formed electrical terminal means for further reduced cost and simplified manufacture.

The invention further comprehends the improved method of selectively controlling the operating characteristics of an appliance motor having an armature and a split-field winding core defined by a pair of opposed core elements, including the steps of mounting the core elements on a mounting structure to rotatably carry the armature. The mounting structure defines shoulder means engaged by the core element for accurately positioning the core elements thereon. The invention comprehends such a method of controlling the operating characteristics of the appliance motor by providing any one of a plurality of different size spacer portions integrally with the mounting structure to extend between the core elements and define any one of a plurality of different flux gap spacings therebetween. The spacer portion of the support extending between the core elements may be caused to extend only partially through the gaps, and in the illustrated embodiment, extends only a minor portion of the volume therebetween so as to cause the gaps to define effectively air gaps which are accurately dimensioned through use of the disclosed spacer means.

The foregoing disclosure of specific embodiments is illustrative of the broad inventive concept comprehended by the invention.

We claim:

1. In a motor structure having an armature, support means for supporting said armature for rotation about an axis, a field coil structure having a pair of opposed C-shaped, laminated cores, each core having a pair of legs forming motor poles, each pole being defined by an armature surface spaced radially from the armature, and a distal end surface, the core further defining a bight portion extending between said legs, said end surfaces of the legs of one core being opposed in spaced alignment with said end surfaces of the poles of the other of the pair of cores to define flux gaps therebetween, and a pair of field coils disposed one each about each said bight portions, the improvement comprising:

a portion of said support means defining spacer means fitting between said end surfaces in said flux gaps for accurately maintaining the minimum spacing between said pole end surfaces and thereby providing an accurately sized air gap between said poles.

2. The motor structure of claim 1 wherein said support means comprises a molded synthetic resin structure.

3. The motor of claim 1 wherein said support means further includes means for engaging said cores remotely of said gaps for cooperation with said spacer means in retaining the cores in accurately preselected spaced relationship.

4. The motor structure of claim 1 wherein said field coils comprise bobbin wound coils.

5. The motor structure of claim 1 wherein the length of said air gap between the poles end surfaces is greater than the radial spacing between the armature and arcuate surfaces of the poles.

6. The motor structure of claim 1 wherein the length of said air gap between the poles end surfaces is in the range of approximately 12 to 14 times the radial spacing between the armature and arcuate surfaces of the poles.

7. The motor structure of claim 1 wherein the ratio of the transverse thickness of the bight to that of the leg portions of the cores perpendicularly to the flux path therethrough is greater than 1.

8. The motor structure of claim 1 wherein the ratio of the transverse thickness of the bight to that of the leg portions of the cores perpendicularly to the flux path therethrough is in the range of approximately 1.1 to 1.2.

9. The motor structure of claim 1 wherein said spacer means occupies a minor portion of the flux gap volume between said leg end surfaces.

10. In a motor structure having an armature, support means for supporting said armature for rotation about an axis, a field coil structure having a pair of opposed C-shaped, laminated cores, each core having a pair of legs forming motor poles, each pole being defined by an armature surface spaced radially from the armature, and a distal end surface, the core further defining a bight portion extending between said legs, said end surfaces of the legs of one core being opposed in spaced alignment with said end surfaces of the poles of the other of the pair of cores to define flux gaps therebetween, and a pair of field coils disposed one each about each said bight portions, the improvement comprising:

a pair of field coils disposed one each about said bight portion, each field coil comprising a plurality of associated insulation elements defining a bobbin and a wire coil wound thereabout; and a portion of said support means defining spacer means projecting partially through said gaps for accurately maintaining the spacing between said pole end surfaces and thereby providing an accurately sized air gap between said poles.

11. The motor structure of claim 10 wherein said cores comprise stacked laminations and said bobbin comprises means for retaining said laminations in stacked assembled relationship.

12. The motor structure of claim 10 wherein said cores comprise stacked laminations and said bobbin comprises means for retaining said laminations in stacked assembled relationship under a preselected pressure.

13. The motor structure of claim 10 wherein said insulation elements include a bobbin tab having means for mounting an electrical terminal thereto for providing electrical connection to the coil wound on the bobbin.

* * * * *